K. H. GYR.
ALTERNATING CURRENT METER.
APPLICATION FILED MAY 12, 1909.

1,039,387.

Patented Sept. 24, 1912.

Witnesses:
C. Heymann
I. Spantikow

Inventor
Karl Heinrich Gyr
by B. Singer atty

UNITED STATES PATENT OFFICE.

KARL HEINRICH GYR, OF ZUG, SWITZERLAND, ASSIGNOR TO THE FIRM OF LANDIS AND GYR, OF ZUG, SWITZERLAND.

ALTERNATING-CURRENT METER.

1,039,387.  Specification of Letters Patent.  Patented Sept. 24, 1912.

Application filed May 12, 1909. Serial No. 495,504.

*To all whom it may concern:*

Be it known that I, KARL HEINRICH GYR, a citizen of the Swiss Confederation, and resident of Zug, Canton of Zug, Switzerland, have invented new and useful Improvements in Alternating-Current Meters, of which the following is a specification.

It is well known that an alternating current meter with a rotary disk that is under the influence of alternating fields only properly measures the electric energy consumed in a circuit if the phase displacement between the magnetic flux due to the series winding and acting upon the disk and the flux due to the potential winding and acting upon the disk amounts to 90°.

The purpose of this invention is by simple means to insure this phase displacement and the greatest accuracy in registering as well as the fullest use being made of the rotary moment with slight consumption of watts. In order to effect this, two principal current coils are for example arranged symmetrically to an auxiliary or shunt circuit electro-magnet, the paths of the lines of force of which lie perpendicularly to each other.

There are meters known in which the lines of force due to the shunt and series windings run in planes that lie perpendicularly to each other. There are also meters known in which the lines of force of the shunt magnetic circuit run partially in paths that are completely closed by iron but in these meters the iron cores provided for the lines of force due to the series and shunt windings are not distinct of each other.

The novelty of the present invention consists in providing for the lines of force of the shunt magnetic circuit, which are motively ineffective a path that is completely closed by iron (without an air-gap) and for the lines of force, that are motively effective a path which is distinct from the path provided for the motively effective lines of force due to the series coils to render the magnetic circuit of the shunt coils independent of the magnetic circuit of the series coils.

Figure 1:
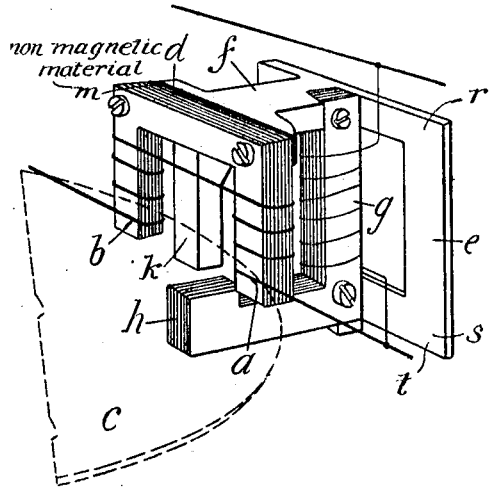
Figure 2:
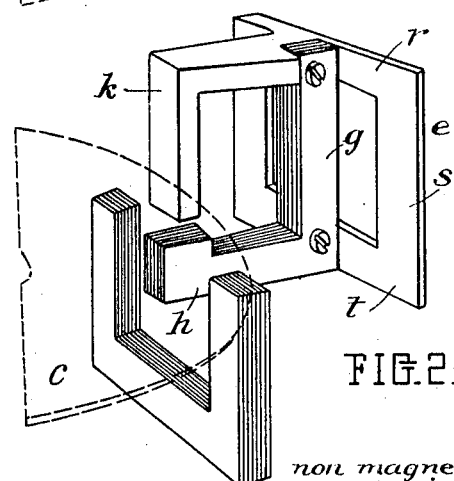
Figure 3:
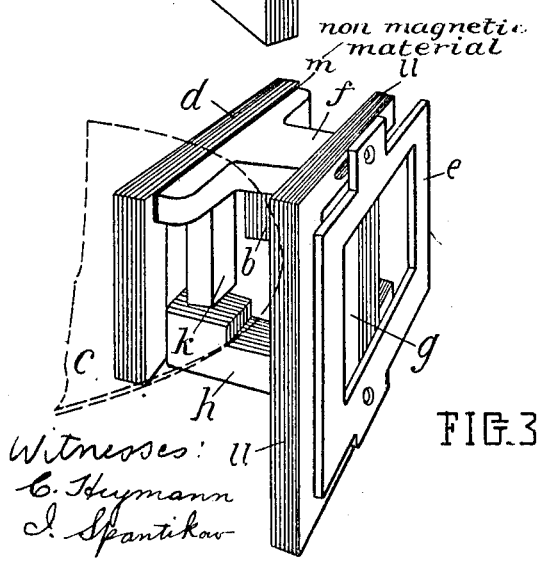
Figure 4:
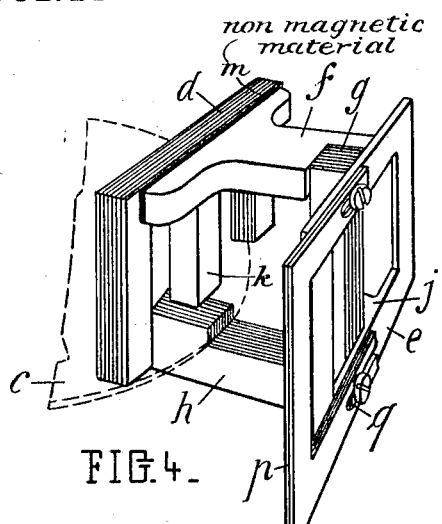
Figure 5:
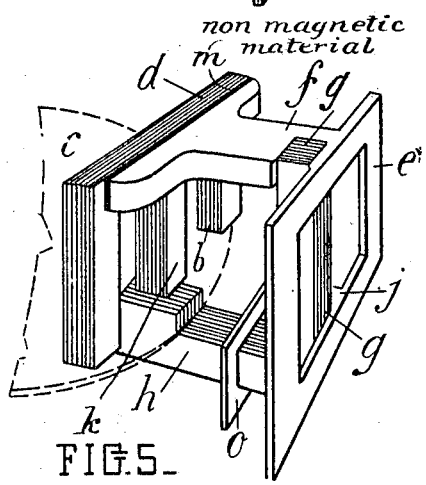

Figure 1 shows in a perspective view the magnetic cores of a meter constructed according to my invention, Fig. 2 shows a modified arrangement of said cores, Fig. 3 shows in combination with said cores a longitudinally adjustable laminated magnetic frame, Fig. 4 shows a modification of the adjustable frame and Fig. 5 shows another modification similar to Fig. 1.

The principal current coils (Fig. 1) $a$ and $b$ are arranged on a divided iron core $d$ above a conductive disk $c$ pivoted in the known manner. The cord $d$ is fixed on a projection of a square frame $e$. It is magnetically insulated from this frame by a layer of non-magnetic material $m$, such as brass. This frame is shown solid in the embodiments illustrated in the drawing, but obviously it may be comprised entirely or partially of thin iron (or steel) plates. Transversely in front of the frame $e$ is disposed the divided iron core $g$ of the shunt circuit coil; the said core being fixed on the projections $f$ and $j$ of the frame $e$ and its free end $h$ extending below the disk $c$. The magnetic field produced by the shunt circuit winding is divided into three branches, two of which run in paths which lie symmetrically to the core. The two paths are completely inclosed and lie motively ineffective outside the disk $c$. These branches are formed by the core $g$, the upper member $r$ of frame $e$, the side portion $S$ of the same and the lower member $t$. A third branch of the lines of force of the shunt circuit field runs through the disk $c$ in a perpendicular direction and returns through the projection $f$ to the core $g$. This branch is formed by the core $g$, projection $h$, depending member $k$ and frame part $f$. In Figs. 1 to 4 the depending member is shown as a solid part, while in Fig. 5 it is shown laminated.

In the form illustrated in Fig. 2 the main-circuit coil is arranged beneath the disk. Instead of one system of alternating current fields groups of such fields may be brought into action on the same disk. By a construction of this kind and by a suitable arrangement of the different elements of construction a phase displacement of 90° or more can be obtained without further auxiliary means. The field generated by the shunt coil is thereby divided into a plurality of components, and that component which motively effects the disk can be brought into the desired direction with respect to the main field by suitable arrangement and strength of the other component or components. For the purpose of regulating and calibrating the meter however means should be provided for enabling the phase displacement to be quickly and conveniently adjusted to a definite angle such as 90°. Such means which enable the regulating to be very precisely effected are illustrated in Figs. 3, 4 and 5.

Figs. 3, 4 and 5 illustrate means for regulating the phase displacement by the application of an additional adjustable magnetic path. The displacement of phase may be regulated as shown in Fig. 3 by means of a bridge-piece *u* made of laminated or solid iron and adjustably applied to the core *g*. As will be seen from Fig. 4 the regulating may also be effected by means of a U-shaped piece *p* which is provided with slots *q* being adjustable on the frame *e*.

An alternative but known method of effecting regulation is shown in Fig. 5 the motively effective branch of the lines of force of the shunt circuit coil being furnished with a short circuit winding *o*.

Having now particularly described and ascertained the nature of my said invention and in what manner the same is to be performed, I claim:

In an alternating current meter the combination with an armature, of main magnetic cores, coils on said cores producing a main flux cutting the armature, a shunt coil, a core for said shunt coil, a frame of magnetic material containing said shunt core, said frame including an air gap, the frame forming a path for a shunt magnetic flux independent of the path of the main flux and cutting the armature and a second entirely closed frame in connection with said shunt core, said second frame also forming a path for a shunt flux independent from said main flux.

In testimony whereof I affix my signature in presence of two witnesses.

KARL HEINRICH GYR.

Witnesses:
GEORG RODH,
CARL GUBLER.